United States Patent
Mentesh et al.

(10) Patent No.: US 6,367,546 B1
(45) Date of Patent: Apr. 9, 2002

(54) CERAMIC COMPONENTS FOR HIGH PRESSURE OIL WELLS

(75) Inventors: Ibrahim M. Mentesh; Carl R. Baenziger, both of Roseville, CA (US)

(73) Assignee: Carpenter Advanced Ceramics, Inc., Auburn, CA (US)

( * ) Notice: Subject to any disclaimer, the term of this patent is extended or adjusted under 35 U.S.C. 154(b) by 0 days.

(21) Appl. No.: 09/451,989

(22) Filed: Nov. 30, 1999

(51) Int. Cl.[7] .............................. E21B 19/00; F16L 7/00
(52) U.S. Cl. ...................................... 166/91.1; 137/375
(58) Field of Search ........................ 137/375; 251/122; 166/91.1, 316

(56) References Cited

U.S. PATENT DOCUMENTS

| | | | | |
|---|---|---|---|---|
| 2,132,199 A | * | 10/1938 | Yancey | 166/76.1 |
| 4,044,991 A | * | 8/1977 | Waller | 251/122 |
| 4,337,788 A | * | 7/1982 | Seger | 137/315 |
| 4,638,833 A | * | 1/1987 | Wolcott, II | 137/312 |
| 4,664,139 A | * | 5/1987 | Pfeiffer | 137/240 |
| 4,705,062 A | * | 11/1987 | Baker | 137/315 |
| 4,732,364 A | | 3/1988 | Seger et al. | |
| 4,735,229 A | | 4/1988 | Lancaster | |
| 4,926,898 A | * | 5/1990 | Sampey | 137/315 |
| 5,201,491 A | * | 4/1993 | Domangue | 251/122 |
| 5,707,214 A | | 1/1998 | Schmidt | |

FOREIGN PATENT DOCUMENTS

| | | |
|---|---|---|
| DE | 3515925 | 6/1986 |
| EP | 0935050 | 8/1999 |

* cited by examiner

Primary Examiner—David Bagnell
Assistant Examiner—Jennifer R. Dougherty
(74) Attorney, Agent, or Firm—Dann Dorfman Herrell and Skillman, P.C.

(57) ABSTRACT

A pressure reducing assembly for high pressure oil wells is disclosed. The assembly includes a metallic body having inlet, outlet, and directional changing flow channels that are lined with ceramic inserts. The assembly also includes a removable pressure reducing device that is preferably formed of a ceramic material. Pipe spool pieces associated with the pressure reducing assembly transition the narrow interior flow diameter of the assembly to the larger interior flow diameter of downstream oil process piping. The spool pieces have metallic bodies, with flow channels that are lined with ceramic inserts. The ceramic inserts are disposed within the metallic spool, and are preferably designed with a flow channel taper that gradually increase the interior flow diameter from that of the outlet channel of the pressure reducing assembly to that of the process piping. The use of the ceramic inserts and liners in the pressure reducing assembly provides a method for increasing the operating life of the flow control components of high pressure oil wells.

24 Claims, 7 Drawing Sheets

CERAMIC COMPONENTS FOR HIGH PRESSURE OIL WELLS

FIELD OF THE INVENTION

This invention relates generally piping components for high pressure oil wells, and in particular to the use of ceramic material in wear components for a pressure reducer assembly for such wells.

BACKGROUND OF THE INVENTION

Many oil well facilities around the world operate under high pressure. In other words, the pressure within the well is sufficiently high (e.g., 3000 to 5000 psi) to carry the crude oil to the surface without pumping. Unless restricted, the crude oil flows to the surface at a high velocity and contains sand and other debris which erodes the interior surfaces of the oil well piping components. In order to limit the amount of sand and debris that is carried with the extracted oil, the high well pressure is maintained in the exit piping by using a pressure reducer at the head end of the well. For instance, a six inch inner diameter well pipe is reduced to three inches through a series of narrow channel pipe components. The flow channel is then further reduced to less than one inch, or even less than one-half inch, in the pressure reducer assembly.

The known pressure reducing devices are made of carbon steel and have tungsten carbide inserts to line the inside surfaces of the flow channels. The abrasive oil-and-sand mixture not only wears away the inside wall of the flow channels, but also backwashes around the outside diameter of the flow reducer and wears away the steel body of the flow reducer, resulting in gross failure of the reducer itself. Often, the metal housing surrounding the flow reducer is severely worn as well. Continuous erosion of the pressure reducer over time results in a slow and continuous loss of desired operating pressure until gross failure requires replacement. This loss in operating pressure causes an ever-increasing sand content, resulting in less efficient oil production. The average life of the known flow reducers is about 4 to 12 weeks. Oil well downtime to replace a pressure reducer and/or other components, is usually four to eight hours. High pressure oil wells typically produce about 5,000 to 12,000 barrels of oil a day. It is readily apparent that the present construction of the oil well pressure reducing assemblies leaves something to be desired with respect to wear resistance and useful life.

SUMMARY OF THE INVENTION

Accordingly, it is a principal object of this invention to extend the operating life of high pressure oil well components, resulting in more efficient oil production.

Another object of this invention is to minimize abrasive wear of the steel surfaces of high pressure oil well components.

Another object of this invention is to minimize erosive channeling (backflow) between a pressure reducer and the reducing valve body by sealing any voids between the reducing valve and the pressure reducer.

Another object of this invention is to increase the wear resistance of flow channel surfaces that are susceptible to erosion wear.

A still further object of this invention is to minimize turbulent flow to lessen the likelihood of channeling and erosion.

The above and other objects are achieved in a pressure reducer made entirely of solid ceramic material, in a ceramic-lined reducing valve, and in ceramic-lined narrow bore piping components, with all ceramic elements susceptible to flow containing modified flow channel designs. The ceramic material may be any one selected from the class of technical ceramics, referring to ceramic materials exhibiting superior mechanical properties.

The ceramic pressure reducer lessens both the interior and exterior erosion that occurs with a steel pressure reducer. The ceramic pressure reducer is fitted into the downstream end of a ceramic-lined reducing valve. The replaceable ceramic linings of the reducing valve are more wear resistant than steel, thus protecting the interior steel surfaces of the reducing valve flow channels. The ceramic liners also provide better sealing of the area between the pressure reducer and the reducing valve channel wall. The ceramic liners in the narrow bore components, and in the reducing valve, not only wear better than steel or carbide materials, but also allow for a more precise flow channel design, thus lessening the deteriorating affects of turbulent vortex flow.

BRIEF DESCRIPTION OF DRAWINGS

The foregoing summary, as well as the following detailed description of a preferred embodiment of the present invention, will be better understood when read in conjunction with the drawings, in which.

DESCRIPTION OF THE PREFERRED EMBODIMENT

Figure 1:
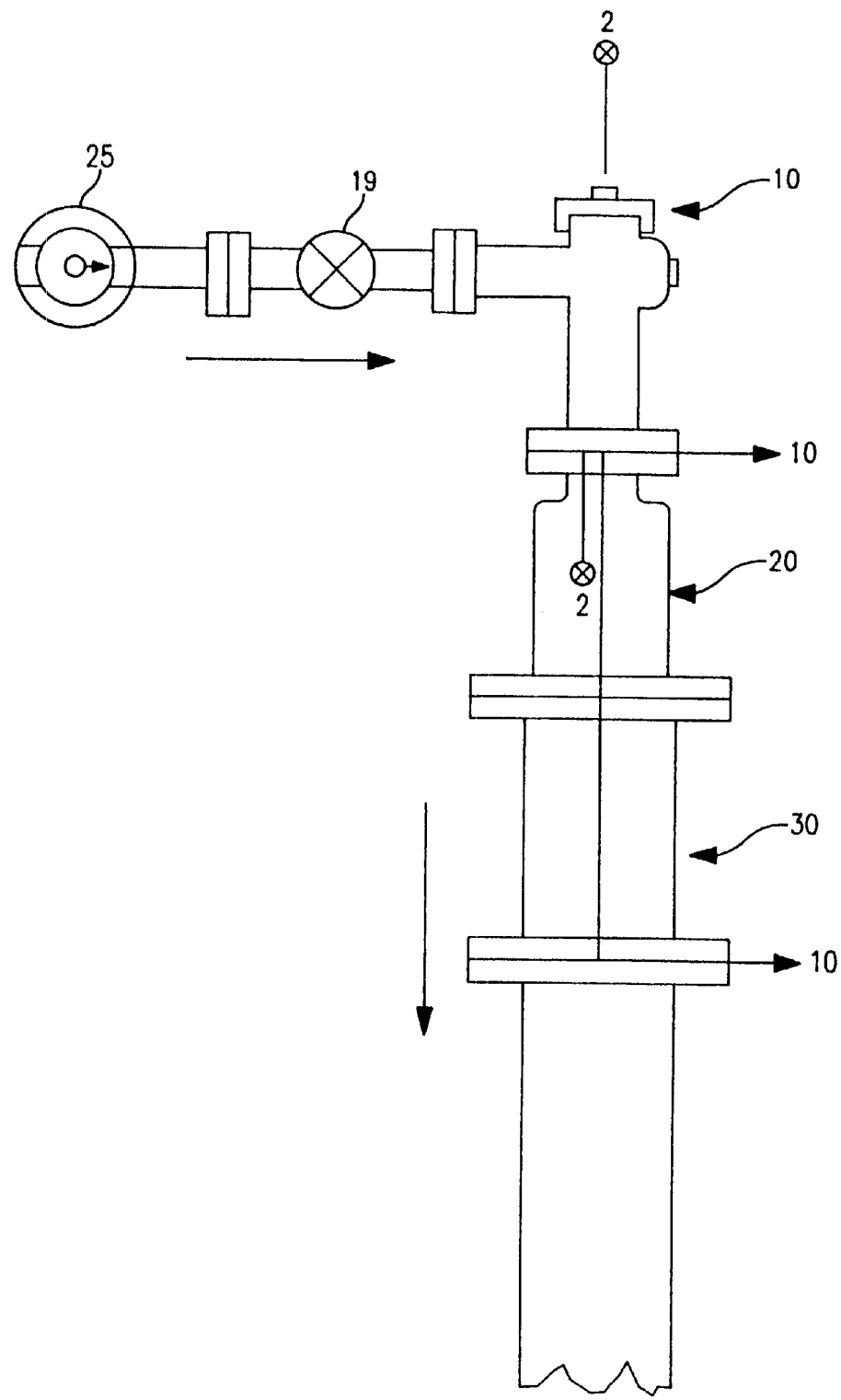
FIG. 1 is a side elevation view of a pressure reducing assembly for a high pressure oil well.

Referring now to the drawings wherein like reference numerals indicate identical or corresponding parts among the several views and in particular to FIG. 1, there is shown a pressure reducing assembly for a high-pressure well head. For purposes of orientation, the oil flow originating from the well flows through the pressure reducing assembly according to the present invention and toward the oil process piping in the direction shown by the arrows. A pressure reducing valve 10 is connected through an isolation valve 19 to a well head manifold 25. The downstream side of pressure reducing valve 10 is connected to a first spool adapter 20, which is connected to a second spool adapter 30. The second spool adapter 30 is connected to the piping that leads to the oil processing facilities (not shown).

Figure 2:
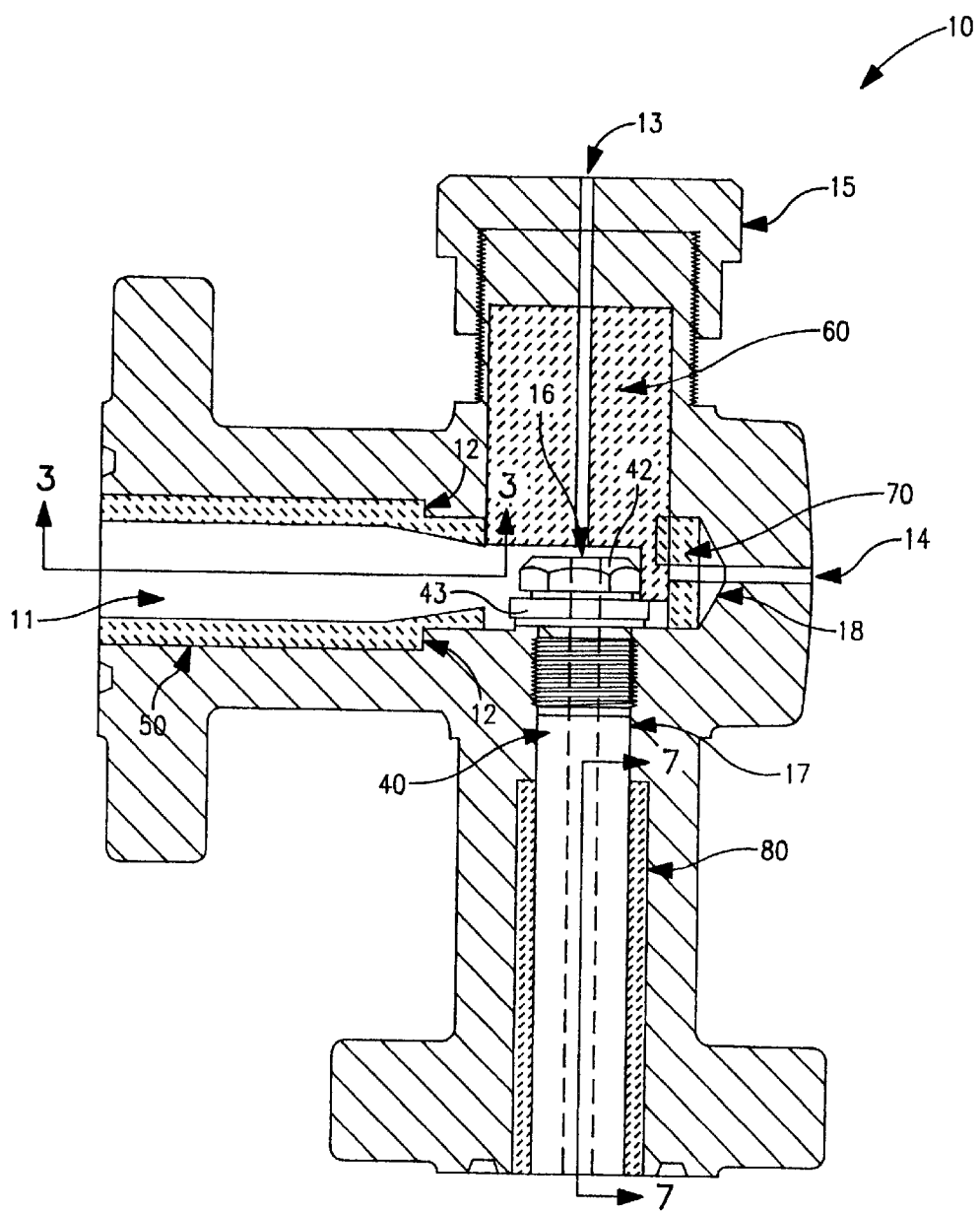
FIG. 2 is a side elevation view in partial cross section showing the interior of the pressure reducing valve of FIG. 1 as viewed along line 2—2 thereof.

Referring now to FIG. 2, the pressure reducing valve 10 has a metallic body that includes an upstream channel 11, a direction-changing cavity 16, a downstream channel 17, and a key-plate recess 18. A pressure reducer 40 is disposed in the downstream channel 17 and has a hex head 42 and a sealing shoulder 43 that extend into the direction-changing cavity 16, adjacent the upstream channel 11. An upstream channel liner 50 is disposed in the upstream channel 11 and a downstream channel liner 80 is disposed in the downstream channel 17. The channel liners 50 and 80 prevent erosion of the inner walls of the channels 11 and 17, respectively, by the oil/sand mixture flowing from the oil well. A direction-changing cavity liner 60 is situated in the direction-changing cavity 16 to prevent erosion and wear of the inner wall of the direction changing cavity 16. A key plate liner 70 is disposed in a key-plate recess 18 situated at an end of the direction-changing cavity 16 adjacent the downstream channel 17. The key plate liner 70 prevents erosion and wear of the metal wall of the key-plate recess 18.

An end cap 15 is provided to close off the direction changing cavity 16. The end cap 15 is removable to permit access to the direction changing cavity 16 for installing and removing the direction changing cavity liner 60 and the key plate liner 70. The end cap 15 can be unthreaded and removed to provide access to direction changing cavity 16. The direction changing cavity liner 60 is removed by sliding it out of the direction changing cavity 16. Once the direction changing cavity liner 60 is removed, the key plate liner 70 can be removed by tilting it out of key plate recess 18 and pulling it through the directional changing cavity 16 and out of the access opening. When the direction changing cavity liner 60 and the key plate liner 70 are removed, the hex head 42 of the pressure reducer 40 is accessible for removal or installation of the pressure reducer 40.

End cap 15 has a port 13 formed therethrough to provide a connection point for a pressure gauge or other pressure sensing device. A second port 14 is formed in the body of pressure reducing valve 10 adjacent to the key-plate recess 18 to provide a connection point for a second pressure gauge or sensing device.

Figure 3:
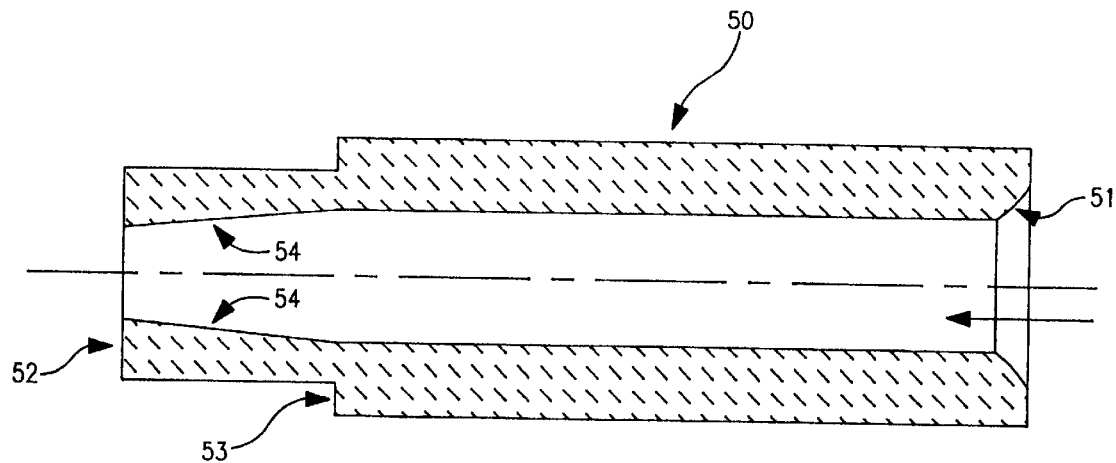
FIG. 3 is a cross-sectional side view of a ceramic liner used in the upstream channel of the pressure reducing valve of FIG. 2, as viewed along line 3—3 thereof.

The upstream channel 11 is generally cylindrical and has an inlet portion characterized by a first diameter and an outlet portion 52 that is characterized by a second diameter smaller than the first diameter. The inlet portion and the outlet portion meet at an upstream channel maintenance point 12 which serves as a stop for the upstream channel liner 50. Referring now to FIG. 3, there is shown an upstream channel liner 50 in accordance with the present invention. The upstream channel liner 50 is generally cylindrical and has an inlet portion and an outlet portion. The inlet portion has a diameter that is essentially commensurate with the inside diameter of the inlet portion of upstream channel 11 and the outlet portion has an outside diameter that is essentially commensurate with the inside diameter of the outlet portion of upstream channel 11. That arrangement provides a shoulder stop 53 on the exterior of the upstream channel liner 50 which abuts the upstream channel maintenance point 12 when inner end 52 is inserted into the upstream channel 11. The abutment of the shoulder stop 53 with the maintenance point 12 prevents the liner from shifting toward the direction changing cavity 16 when oil is flowing. The upstream channel liner 50 has an internal channel that extends from an opening 51 to the outlet portion 52. The opening is preferably flared to lessen flow turbulence as the oil enters the upstream channel liner 50. In the embodiment shown in FIG. 3, the internal channel tapers to a smaller cross section as it traverses the outlet portion 52. The tapered channel portion 54 relieves some of the pressure and turbulent flow of the oil as it flows through the upstream channel 11. The upstream channel liner 50 is formed of a ceramic material.

Figure 4:
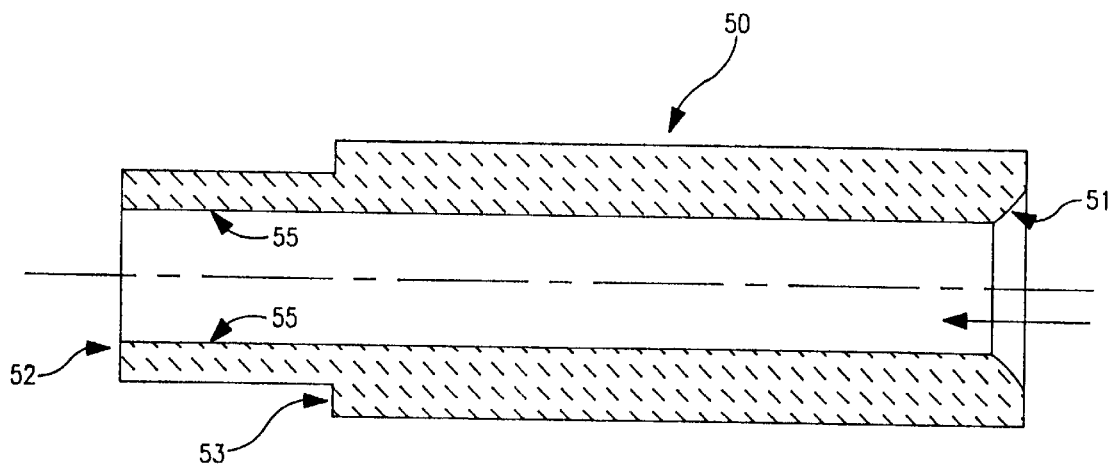
FIG. 4 is a cross-sectional side view of an alternative embodiment of the ceramic liner shown in FIG. 3.

Shown in FIG. 4 is an alternative embodiment of the upstream channel liner 50. In the embodiment shown in FIG. 4, the internal channel 55 has a uniform cross section to maximize flow.

Figure 5A:
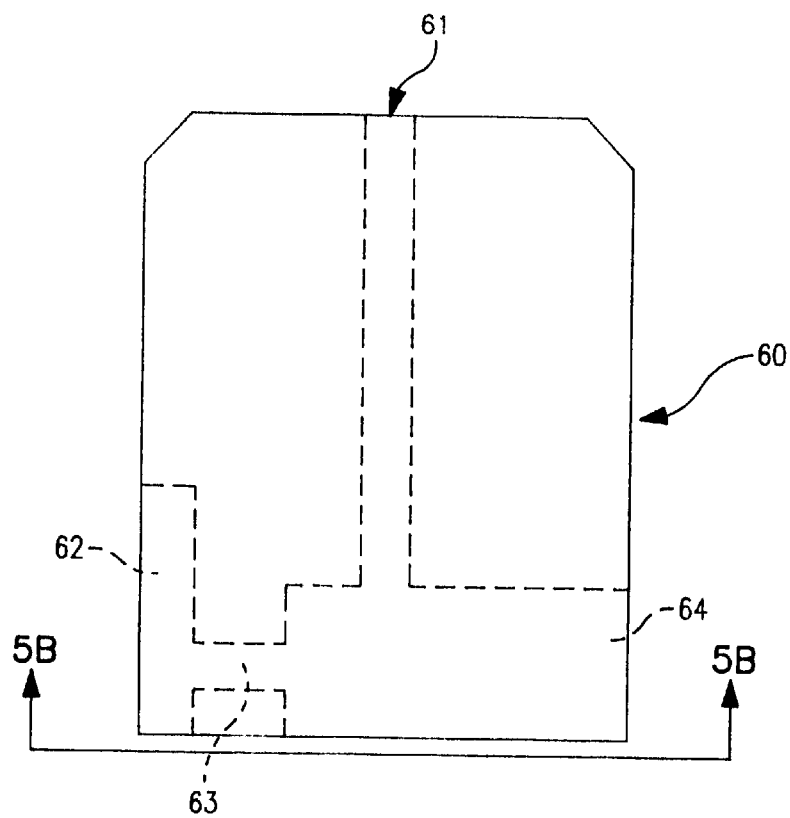
FIG. 5A is side view of a direction changing cavity liner used in the pressure reducing valve shown in FIG. 2.
Figure 5B:
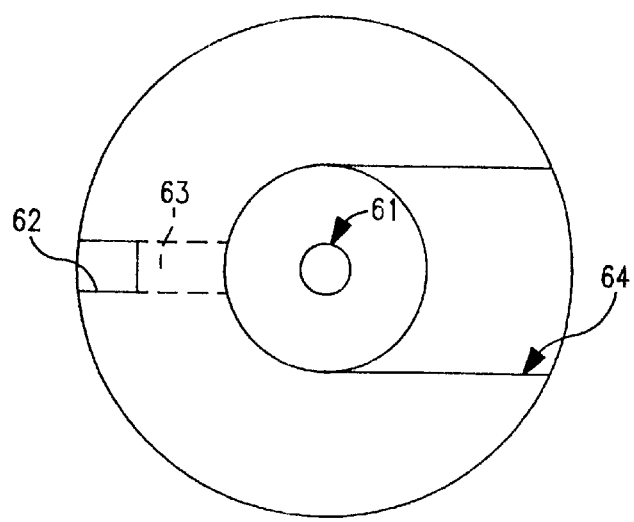
FIG. 5B is an end view of the direction changing cavity liner shown in FIG. 5A as viewed along line 5B—5B thereof.

Referring now to FIGS. 2, 5A, and 5B, the direction changing cavity liner 60 is disposed within the directional changing cavity 16 of pressure reducing valve 10. The directional changing cavity liner 60 is formed of a ceramic material. The liner 60 is generally cylindrical and has an outside diameter that is dimensioned to provide a snug fit between the outer surface of the liner 60 and the inner surface of the cavity 16. A recess 64 is formed in one end of the liner 60. The recess is dimensioned to provide a space around the head 42 and shoulder 43 of the pressure reducer 40 when it is fully threaded into the downstream channel 17. A central through-hole 61 extends along the length of the direction changing cavity liner 60 to provide a path between the recess 64 and the port 13 for pressure indication. The directional changing cavity liner 60 has a key-way 62 formed thereon which extends longitudinally partially along the exterior of direction changing cavity liner 60. The directional changing cavity liner 60 also has a key plate thru-hole 63 formed therein between the recess 64 and the key-way 62 to provide fluid communication between recess 64 and port 14.

Figure 6B:
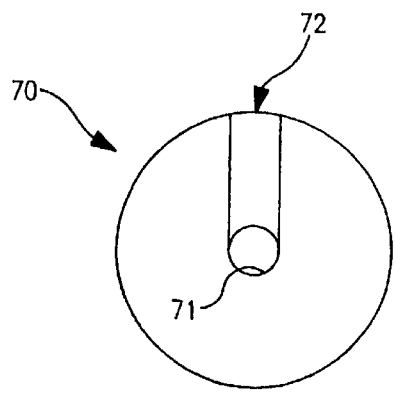
FIG. 6B is an end view of the key plate liner shown in FIG. 6A as viewed along line 6B—6B thereof.
Figure 6A:
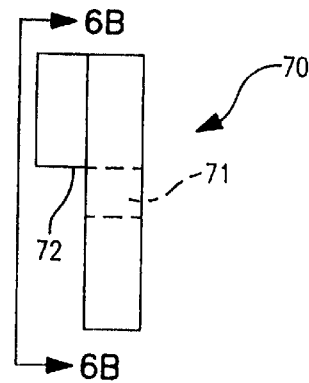
FIG. 6A is a side view of a key plate liner used in the pressure reducing valve shown in FIG. 2.

Referring now to FIGS. 2, 6A, and 6B, the key plate liner 70 is positioned within the key plate recess 18 of reducing valve 10. Key plate liner 70 contains a key plate thru-hole 71 which aligns with the key plate port 14 and the key plate thru-hole 63 to provide fluid communication between the recess 64 and the key plate port 14. Key plate liner 70 also has a key 72 formed thereon which is dimensioned to mate with the key-way 62 in liner 60 to ensure proper alignment of the key plate liner 70 and the cavity liner 60. The key plate liner 70 is formed of a ceramic material.

Figure 7:
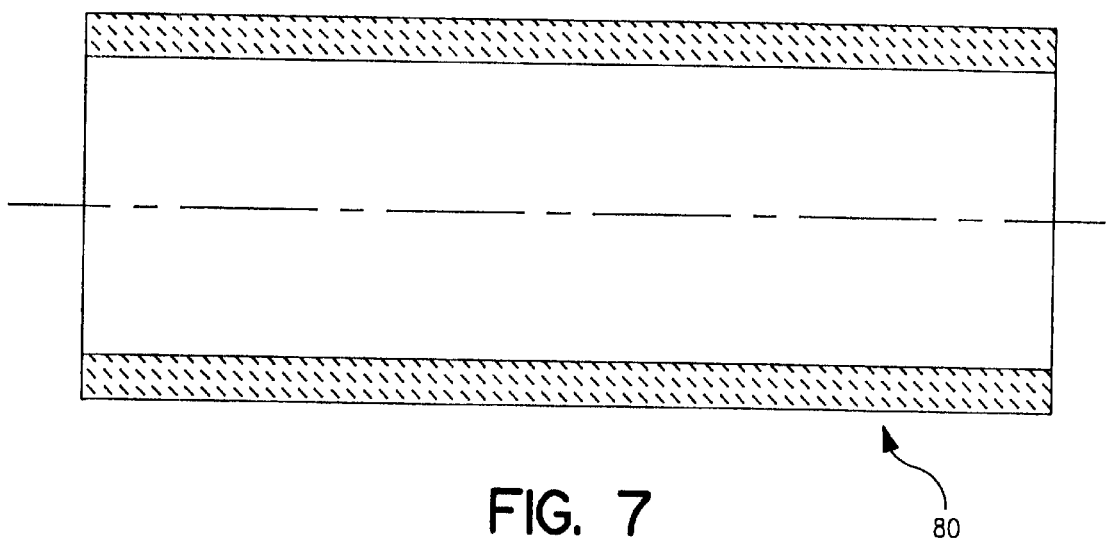
FIG. 7 is a cross-sectional side view of a downstream cylindrical liner used in the pressure reducing valve of FIG. 2, as viewed along line 7—7 thereof.

Referring now to FIGS. 2 and 7, the downstream channel liner 80 is disposed within the downstream channel 17. The downstream channel 80 is generally cylindrical in shape and has an outside diameter that is dimensioned to provide a tight fit with the downstream channel 17. Because of that arrangement, the downstream liner 80 prevents the oil from backwashing between the liner and the interior wall of downstream channel 17. The downstream channel 80 extends less than the full length of the downstream channel 17 so that an attachment region is provided where the pressure reducer 40 can be attached to the body of the pressure reducing valve 10. In the embodiment shown, the pressure reducer 40 is attached by threading it into the downstream channel 17. The downstream channel liner 80 is formed of a ceramic material.

Figure 8:
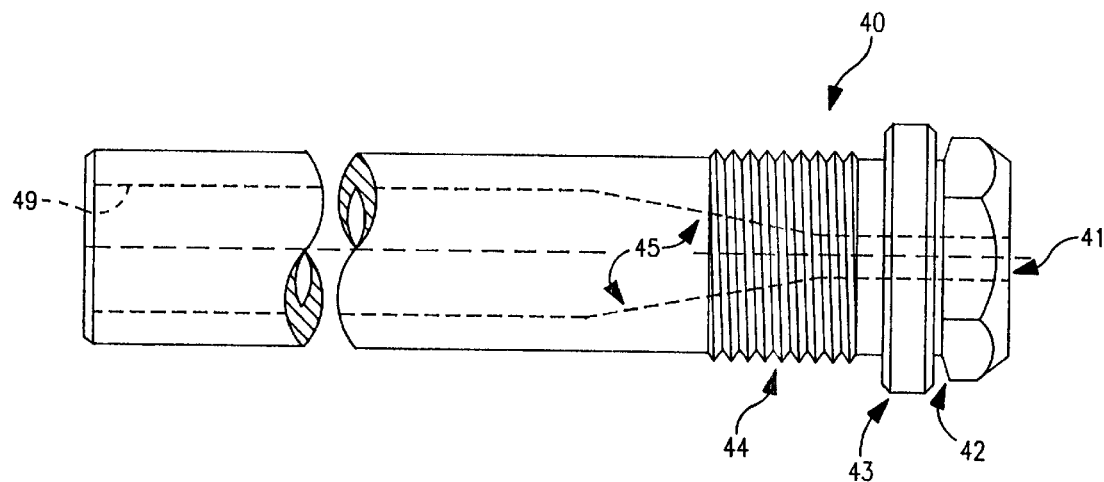
FIG. 8 is a side view of a ceramic flow reducer used in the pressure reducing valve shown in FIG. 2.

As shown in FIG. 2, pressure reducer 40 is situated in downstream channel 17 and projects into direction changing cavity 16. Referring now to FIG. 8, there is shown a preferred arrangement for the pressure reducer 40. The pressure reducer 40 is generally cylindrical and has an outside diameter that is substantially commensurate with the inside diameter of downstream liner 80. A series of screw threads 44 are formed on the outer surface adjacent the shoulder 43. The pressure reducer 40 is formed of a ceramic material. A central channel 45 extends longitudinally through the body of the pressure reducer 40 from entry port 41 to an outlet port 49. The central channel 45 flares to a larger inside diameter to provide a pressure reducing effect as the oil flows from entry port 41 through the central channel. When the pressure reducer 40 is threaded into the downstream channel 17, sealing shoulder 43 presses against a washer or gasket to provide a fluid-tight seal against the abrasive flow of oil and sand from direction changing cavity 16. The washer or gasket is preferably formed of Buena-N gasket material or an equivalent thereof.

Figure 9:
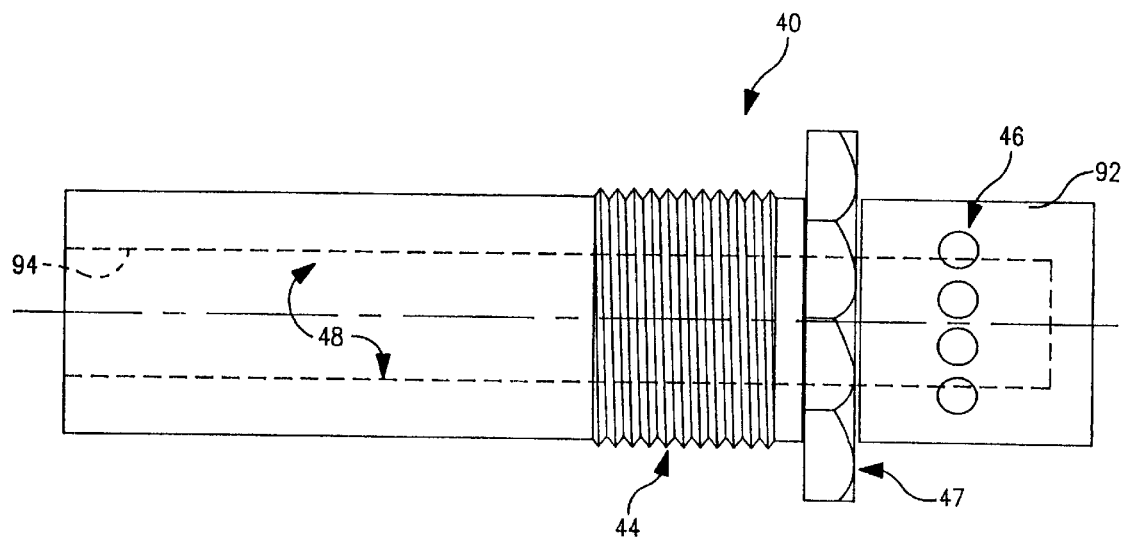
FIG. 9 is a side view of an alternative embodiment of the ceramic flow reducer shown in FIG. 8.

FIG. 9 shows an alternative embodiment of pressure reducer 40. The embodiment shown in FIG. 9 has a generally cylindrical body including a head portion 92 with a plurality of entry holes 46 formed therein to provide an inlet for the oil. The pressure reducer 40 has a central channel 48 formed longitudinally therethrough. The central channel 48 has a substantially uniform cross section along its length and extends from the head portion 92 to an outlet port 94 in the other end of the pressure reducer 40. The entry holes 46 are in fluid communication with the central channel 48. A hexagonal shoulder 47 is formed about the circumference of the pressure reducer 40 adjacent the head portion 92. The hexagonal shoulder 47 performs the functions of the hex head 42 and shoulder 43 of the embodiment shown in FIG. 8.

Referring back to FIG. 2, upstream cylindrical liner 50 and downstream cylindrical liner 80 are removed by un-bolting flange connections at both ends of reducing valve 10, removing reducing valve 10 from the process piping, and sliding upstream cylindrical liner 50 and downstream cylindrical liner 80 out of upstream canal 11 and downstream canal 17, respectively. The liners are installed by reversing this process.

Figure 10:
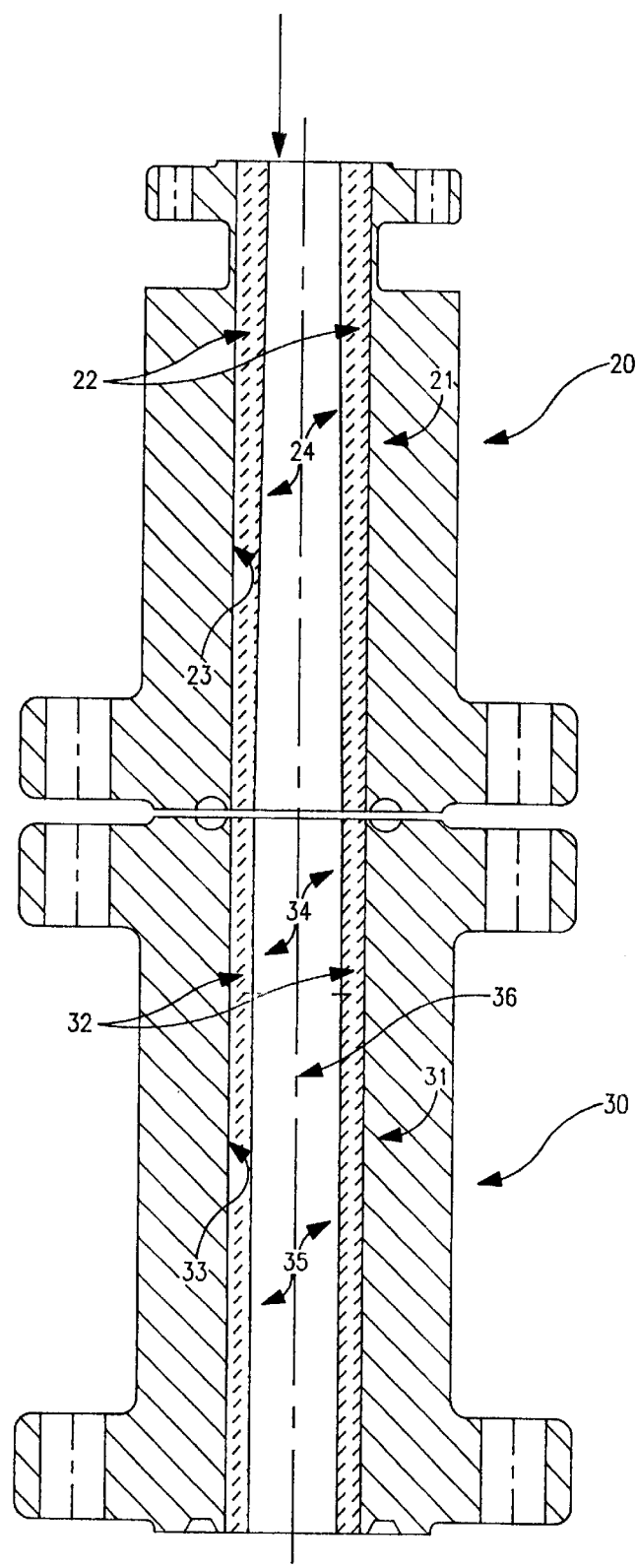
FIG. 10 is a side elevational view in cross section showing a spool adapter assembly used in the pressure reducing assembly of FIG. 1 as viewed along line 10—10 thereof.

Referring now to FIG. 10, there is shown a spool assembly including a first spool adapter 20 and second spool adapter 30. First spool adapter 20 has a steel body with a central longitudinal channel 21 having a substantially uniform cross section along the length thereof. A ceramic channel liner 22 having a substantially uniform outside diameter 23 that is dimensioned to provide a light press fit in the central channel 21 of first spool adapter 20. The ceramic channel liner 22 extends substantially the entire length of the central channel 21. Channel liner 22 has a flow channel 24 that extends the length of the channel liner 22. The cross section of the flow channel 24 gradually widens in the direction of the oil flow from the inlet of the spool adapter 20 adjacent the pressure reducing valve 10 to its outlet adjacent the second spool adapter 30. The gradual widening or flaring of the flow channel 24 minimizes turbulent, abrasive, flow that would aggravate the wear and erosion caused by the flow of oil and sand therethrough, thus increasing the useful life of the spool adapter 20.

The second spool adapter 30 has a steel body with a central longitudinal channel 31. A ceramic channel liner 32 has a substantially uniform outside diameter 33 that is dimensioned to provide a light press fit in the central channel 31 of second spool adapter 30. Ceramic channel liner 32 has a flow channel 36 that extends from the inlet adjacent the first spool adapter to the outlet adjacent the downstream process piping (not shown). The central channel 36 has a flared portion 34 and a uniform cross section portion 35. The flared portion 34 extends from the inlet along part of the length of ceramic liner 32. The degree of flaring is such as to continue the flaring of the flow channel 24 of the first spool adapter 20. The inside diameter of the uniform cross section portion 35 is dimensioned to be commensurate with the inside diameter of the downstream process piping.

As described above, the pressure reducer 40, upstream channel liner 50, direction changing cavity liner 60, key plate liner 70, downstream channel liner 80, and the central longitudinal channel liners 22 and 32, are all formed of a ceramic material. The ceramic material is selected from the class of technical ceramics, particularly technical ceramic materials that exhibit superior wear resistance and strength. Among the preferred ceramic materials are aluminum oxide (alumina), chromium oxide, high alumina, titanium oxide (titania), zirconium oxide (zirconia) ceramics, including fully and partially stabilized zirconia, and combinations of such metal oxides. It is believed that just about any type of metal-oxide ceramic will provide acceptable properties. Excellent results have been achieved using partially stabilized zirconia (PSZ) for making the aforesaid components. Particular species of PSZ that are believed to be useful for the aforesaid components include Mg-PSZ and yttria PSZ. Silicon nitride, quartz, and silicon carbide ceramics are also expected to be useful in such components.

It can be seen from the foregoing description and the accompanying drawings that the present invention provides a novel means for extending the operating life of high pressure oil well components and for maintaining desired operating pressures by substantially reducing the rate of abrasive wear to components in a pressure reducing assembly for a high pressure oil well head. Although the invention has been described with reference to specific components and assemblies thereof, including a ceramic pressure reducer, a ceramic-lined reducing valve, and ceramic-lined spool pipe adapters, it is contemplated that any metal component in such a pressure reducing assembly that is subject to erosive wear caused by the flow of an oil/sand mixture under very high pressure can be formed from or lined with a ceramic material to substantially reduce the rate of wear and erosion. A distinct advantage of the present invention is that a high pressure oil well, incorporating ceramic components in accordance with this invention, can be operated at the desired high well pressures while keeping the sand content low. The desired high pressures can be maintained over a much longer period of time than obtainable with known components because component deterioration is minimized. Lost oil production resulting from well down-time, during spent component replacement, is drastically reduced, because of the increased wear resistance and more efficient flow design of the ceramic components.

It will be recognized by those skilled in the art that changes or modifications may be made to the above described embodiments without departing from the broad, inventive concepts of the invention. It is understood, therefore, that the invention is not limited to the particular embodiment(s) disclosed, but is intended to cover all modifications and changes which are within the scope and spirit of the invention as defined in the appended claims.

What is claimed is:

1. A pressure reducing device for a high pressure well comprising:
   an elongated, generally cylindrical body having an inlet end and an outlet end, said body being formed of a technical ceramic material selected from the group consisting of alumina, chromium oxide, titania, zirconia, partially stabilized zirconia, silicon nitride, silicon carbide, and combinations thereof;
   a flow channel formed in said body extending along a longitudinal, central axis of said body from the inlet end to the outlet end, said flow channel terminating in an outlet opening at the outlet end;

an inlet opening formed in the inlet end of said body so as to be in fluid communication with said flow channel;

means for securing said body in a channel of a housing such that said body does not move axially in the housing channel; and sealing means formed at the inlet end of said body for forming a liquid-tight seal between said body and the housing such that forward flowing oil is prevented from entering any space between said body and the housing.

2. A pressure reducing device as set forth in claim 1 wherein said flow channel is shaped so as to provide a reduction in the pressure of a fluid flowing therethrough.

3. A pressure reducing device as set forth in claim 1 wherein the cylindrical body is formed from a partially stabilized zirconia ceramic material.

4. A pressure reducing device as set forth in claim 3 wherein the partially stabilized zirconia ceramic material is magnesia partially stabilized zirconia.

5. A pressure reducing device as set forth in claim 3 wherein the partially stabilized zirconia ceramic material is yttria partially stabilized zirconia.

6. A pressure reducing device as set forth in any of claims 1–5 wherein the inlet opening is formed on the longitudinal axis and the flow channel terminates at said inlet opening.

7. A pressure reducing device as set forth in any of claims 1–5 wherein the securing means comprises:

external threads formed on said body so as to mate with internal threads formed in the housing channel; and flat surfaces formed on said body at the inlet end for facilitating the application of a tool to rotate said body so as to thread it into or out of the housing channel.

8. A pressure reducing device as set forth in claim 7 wherein the sealing means comprises a circumferential shoulder formed on said body adjacent the inlet end.

9. A pressure reducing device as set forth in any of claims 1–5 wherein the sealing means comprises a circumferential shoulder formed on said body adjacent the inlet end.

10. A pressure reducing device as set forth in claim 9 wherein:

the securing means comprises external threads formed on said body so as to mate with internal threads formed in the housing channel; and the circumferential shoulder comprises flat surfaces formed thereon for facilitating the application of a tool to rotate said body so as to thread it into or out of the housing channel.

11. A pressure reducing device as set forth in claim 9 wherein the inlet opening is formed at an angle from the longitudinal axis.

12. A pressure reducing device as set forth in any of claims 1–5 wherein said flow channel is flared from a smaller diameter at the inlet end to a larger diameter at the outlet end.

13. A pressure reducing assembly for a high pressure well comprising:

a housing formed of a metallic material, said housing having an inlet channel, and outlet channel, and a direction changing cavity;

a first ceramic liner disposed in said inlet channel so as to line the entire internal surface of said inlet channel;

a fixed pressure reducer disposed in said outlet channel, said pressure reducer comprising:

an elongated, generally cylindrical body having an inlet end and an outlet end, said body being formed of a technical ceramic material selected from the group consisting of alumina, chromium oxide, titania, zirconia, partially stabilized zirconia, silicon nitride, silicon carbide, and combinations thereof;

a flow channel formed in said body extending along a longitudinal, central axis of said body from the inlet end to the outlet end, said flow channel terminating in an outlet opening at the outlet end;

an inlet opening formed in the inlet end of said body so as to be in fluid communication with said flow channel;

means for securing said body in the outlet channel of said housing such that said body does not move axially in the outlet channel; and sealing means formed at the inlet end of said body for forming a liquid-tight seal between said body and the housing such that forward flowing fluid is prevented from entering any space between said body and the housing;

a second ceramic liner disposed in said outlet channel between the inner surface of the outlet channel and the pressure reducer; and a third ceramic liner disposed in said direction changing cavity so as to line the entire internal surface of said direction changing cavity;

said ceramic liners and said pressure reducer being formed of a technical ceramic material selected from the group consisting of alumina, chromium oxide, titania, zirconia, partially stabilized zirconia, silicon nitride, silicon carbide, and combinations thereof.

14. A pressure reducing assembly as set forth in claim 13 wherein the flow channel of said pressure reducer is shaped so as to provide a reduction in the pressure of a fluid flowing therethrough.

15. A pressure reducing assembly as set forth in claim 13 wherein the cylindrical body of the pressure reducer, the first ceramic liner, the second ceramic liner, and the third ceramic liner are formed from a partially stabilized zirconia ceramic material.

16. A pressure reducing assembly as set forth in claim 15 wherein the partially stabilized zirconia ceramic material is magnesia partially stabilized zirconia.

17. A pressure reducing assembly as set forth in claim 15 wherein the partially stabilized zirconia ceramic material is yttria partially stabilized zirconia.

18. A pressure reducing assembly as set forth in any of claims 13–17 wherein the inlet channel comprises an inlet portion having an inside diameter and an outlet portion having inside diameter smaller than the inside diameter of said inlet portion; and wherein the first ceramic liner has an inlet portion having an outside diameter that is commensurate with the inside diameter of the inlet portion of the inlet channel and an outlet portion having an outside diameter commensurate with the inside diameter of the outlet portion of the inlet channel, said inlet portion of said first ceramic liner adjoining said outlet portion of said first ceramic liner to form a stop on said first ceramic liner.

19. A pressure reducing assembly as set forth in claim 18 wherein the first ceramic liner has an inside diameter that tapers from a first dimension at the inlet portion to a second dimension at the outlet portion, said second dimension being smaller than said first dimension.

20. A pressure reducing assembly as set forth in any of claims 13–17 wherein the third ceramic liner comprises a direction changing cavity liner and a key plate liner.

21. A pressure reducing assembly as set forth in claim 20 wherein said direction changing cavity liner comprises a generally cylindrical body having a key way and a recess formed at one end of the cylindrical body, a first through-hole extending between said key way and said recess, and a second through-hole extending between said recess and a second end of the cylindrical body.

22. A pressure reducing assembly as set forth in claim 21 wherein said key plate liner comprises a disc-shaped body and a key portion formed on a flat surface of the disc-shaped body such that said key portion mates with the key way in said direction changing cavity liner when the pressure reducing assembly is assembled.

23. A pressure reducing assembly as set forth in any of claims 13–17 further comprising a pipe spool connected to said housing at an outlet end of the outlet channel, said pipe spool comprising a metallic body having a central channel formed longitudinally therethrough, and a fourth ceramic liner disposed in said central channel, said fourth ceramic liner having a flow channel extending longitudinally therethrough.

24. A pressure reducing assembly as set forth in claim 23 wherein the flow channel of the fourth ceramic liner has an inlet end and an outlet end, and the flow channel is flared along its length to provide a gradually increasing cross-sectional from the inlet end to the outlet end.

* * * * *